United States Patent
Nakamura et al.

[11] Patent Number: 6,106,190
[45] Date of Patent: Aug. 22, 2000

[54] MARINE FENDER WITH STRUCTURE FOR FIXING PAD TO FENDER FRAME

[75] Inventors: Masahiro Nakamura; Noboru Yamaguchi; Takuma Tokura, all of Kanagawa, Japan

[73] Assignee: Bridgestone Corporation, Tokyo, Japan

[21] Appl. No.: 09/118,920

[22] Filed: Jul. 20, 1998

[30] Foreign Application Priority Data

Jul. 29, 1997 [JP] Japan .................................... 9-203068

[51] Int. Cl.⁷ .................................................. B63B 59/02
[52] U.S. Cl. .......................... 403/408.1; 403/22; 403/12; 114/219; 405/215
[58] Field of Search .................... 403/408.1, 21, 403/22, 11, 12; 114/219; 405/212, 215

[56] References Cited

U.S. PATENT DOCUMENTS

| | | |
|---|---|---|
| 3,664,075 | 5/1972 | Hazlewood et al. . |
| 4,721,414 | 1/1988 | Akiyama .............................. 114/219 X |
| 4,854,258 | 8/1989 | Hausmann et al. ...................... 114/219 |
| 5,000,607 | 3/1991 | Parlatore et al. .......................... 403/12 |
| 5,139,361 | 8/1992 | Camuffo ................................ 403/408.1 |
| 5,361,715 | 11/1994 | Kiedaisch et al. . |
| 5,791,278 | 8/1998 | Orndorff, Jr. ............................ 114/219 |

OTHER PUBLICATIONS

Patent Abstracts of Japan, vol. 009, No. 176(M–398), Jul. 20, 1985 & JP 60 047107 A (Bridgestone KK), Mar. 14, 1985.

Patent Abstracts of Japan, vol. 98, No. 11, Sep. 30, 1998 & JP 10 159058 A (Bridgestone Corp), Jun. 16, 1998.

*Primary Examiner*—Terry Lee Melius
*Assistant Examiner*—John R. Cottingham
*Attorney, Agent, or Firm*—Kanesaka & Takeuchi

[57] ABSTRACT

In a marine fender with a structure for fixing a pad to a fender frame, the pad has at least one concavity formed in a front surface thereof, and a pad hole piercing the pad from a bottom of the concavity. A bolt with a head is inserted from a front side of the pad through the pad and fender holes, and a nut is disposed at a rear side of the fender frame to engage the bolt to thereby fix the pad to the fender frame. A washer is interposed between the head of the bolt and the bottom of the concavity. In case the bolt is attached to the fender frame, the nut is disposed in the concavity of the pad to engage the bolt, and the washer is interposed between the nut and the bottom of the concavity. In either case, the washer is disposed in the concavity such that a rim of the washer engages an inner periphery of the concavity to prevent rotation with each other. The head of the bolt or nut is joined to the washer.

9 Claims, 7 Drawing Sheets

MARINE FENDER WITH STRUCTURE FOR FIXING PAD TO FENDER FRAME

FIELD OF THE INVENTION

The present invention relates to a marine fender for preventing a direct contact between, for example, a wharf and a hull, and more particularly to a marine fender in which a structure of fixing pads to a fender frame attached to the front of a fender body is improved.

DESCRIPTION OF PRIOR ART

A marine fender generally comprises a fender body made of cushioning material such as rubber and a fender frame attached to the front of the fender body. To reduce the coefficient of friction between the hull and the fender frame and thereby reduce the shearing stress loaded on the fender body, the fender frame is provided with plate-like pads made of a material having low coefficient of friction, such as polyethylene, nylon, on the face thereof.

Such a conventional example of marine fender will be described with reference to FIG. 2 through FIG. 4. FIG. 2 is a perspective view showing the marine fender according to the conventional example in its used state, FIG. 3a is a sectional view showing a state of fixing pads, and FIG. 3b is a view along the line 3b—3b FIG. 3a.

The marine fender 10 comprises a cylindrical fender body 12, a fender frame 14 attached to the fender body 12, and pads 16 disposed on the face of the fender frame 14. The fender body 12 is fixed to a side of a wharf or quay 18 in such a manner that the cylinder axis thereof extends in the horizontal direction.

The fender body 12 is provided with flanges 12a, 12b at the both ends thereof, respectively, wherein the rear-side flange 12a is fixed to the wharf 18 by anchor bolts 20 and nuts 22 screwed onto the anchor bolts 20.

Hooks 12c disposed on the fender frame 14 and U-anchors 24, 23 fixed to the wharf 18 are connected by shear chains 26 and tension chains 28, respectively, to restrain the deformation of the fender body 12. The fender frame 14 and a U-anchor 25 are connected by a rubber flex chains 30.

The fender frame 14 is fixed to the front-side flange 12b of the fender body 12 by bolts and nuts (not shown).

Attached to the face of the fender frame 14 are pads 16 which are made of a material having low coefficient of friction, such as polyethylene. When a boat bumps, an outer surface of the hull of the boat slides onto the outer surfaces of the pads 16, thereby preventing excessive shear deformation of the fender body.

As shown in FIG. 3a and FIG. 3b, each pad 16 is provided with counterbore-like concavities 32 and is pierced with bolt through holes 34 perpendicularly in such a manner that each bolt through hole 34 extends through the center of the corresponding concavity 32. Bolts 38 are inserted from the face side of the pad through the respective bolt through holes 34 and corresponding bolt through holes 36 of the fender frame 14 and are screwed into respective nuts 40, thereby fixing the pad 16 to the fender frame 14. Interposed between the head of each bolt 38 and a bottom surface 32a of each concavity 32 is a washer 42. The concavity 32 is formed in a cylindrical shape and the washer 42 is formed in a ring shape.

FIG. 4 is a perspective view showing a marine fender 50 according to another conventional example in the used state. The marine fender 50 has fender bodies 52 which are each made of rubber and formed to have a V-like section. Rear-side flanges 52a of each fender body 52 are fixed to a side of the wharf 18 by anchor bolts.

A fender frame 54 is attached to the respective front surfaces of the fender bodies 52. Attached to the fender frame 54 are pads 16. The structure for fixing the pads 16 to the fender frame 54 is the same as shown in FIG. 3a and FIG. 3b.

In the conventional structure of fixing the pads to the fender frame of the marine fender, the fastening between the bolts 38 and the nuts 40 for fixing the pads 16 to the fender frame 14 or 54 tends to be loose. To prevent the fastening from being loose, the bolts and the nuts are welded from the fender body 12, 52 side of the fender frame. In this case, since it does not allow the pads to be removed, when the replacements of the pads are is required due to the wear, the fender frame 14, 54 must be removed from the fender body for the replacements work so that the replacement of the pads need a lot of time and great cost.

OBJECT AND SUMMARY OF THE INVENTION

It is an object of the present invention to provide a fixing structure which securely prevents the looseness of pad-fixing bolt in a simple manner and allows the removals and replacements of pads attached to the face of a fender frame of a marine fender.

DESCRIPTION OF PREFERRED EMBODIMENTS

Figure 1A:
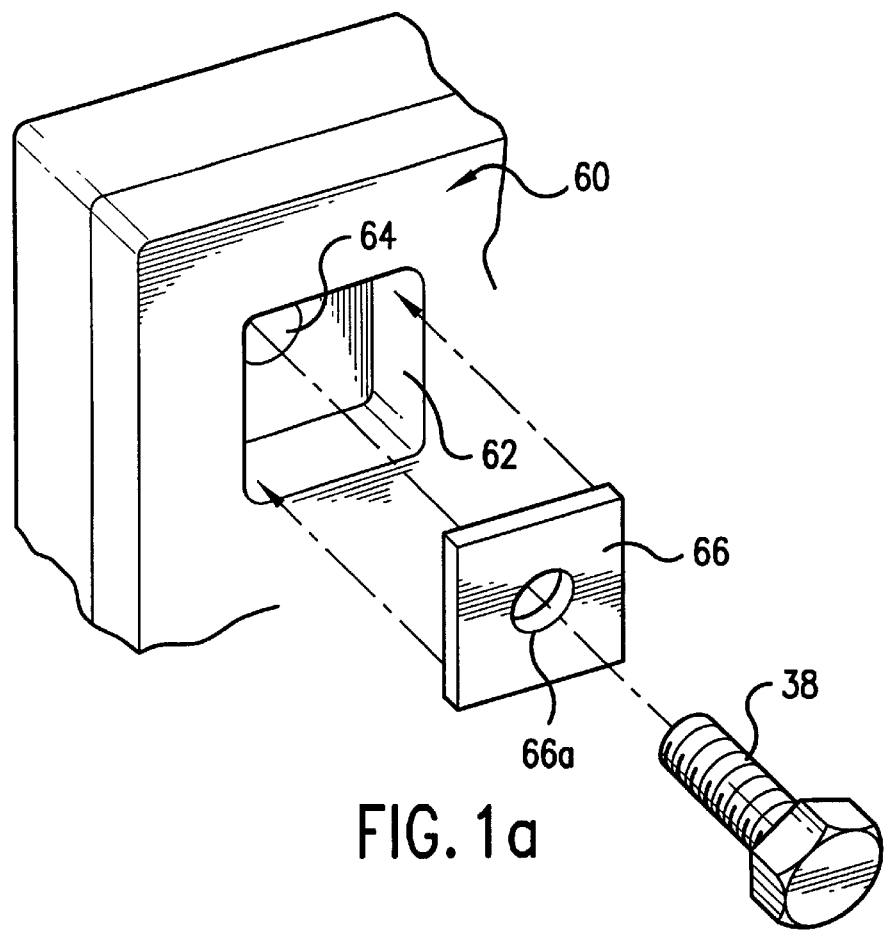
FIGS. 1a and 1b are structural views of a marine fender according to an embodiment.
Figure 1B:
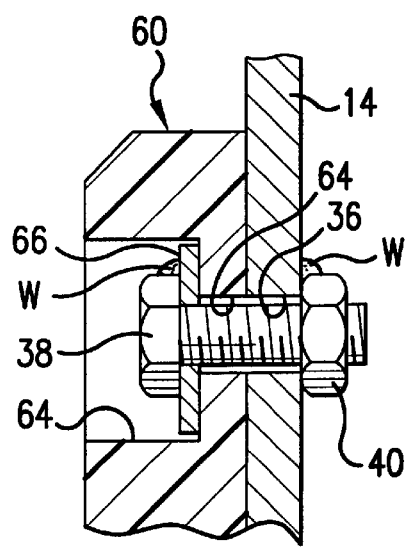

FIG. 1a is an exploded perspective view showing a structure for fixing pads of a marine fender according to an embodiment and FIG. 1b is a sectional view showing the structure for fixing pads.

Each pad 60 is provided with rectangular concavities 62 formed in the face thereof and is pierced with bolt through holes 64 perpendicularly in such a manner that each bolt through hole 64 extends through the center of the corresponding concavity 62. Inserted into each concavity 62 is a washer 66 which is slightly smaller than the concavity 62. A bolt 38 is inserted through a central hole 66a of the washer 66 and the bolt through holes 64, 36. The distal end of the bolt 38 is screwed into a nut 40 on the rear side of the fender frame 14. After sufficiently tightening the bolt 38 into the nut 40, the head of the bolt 38 is welded to the washer 66. In FIG. 1b, the mark W designates a welded portion (weld metal).

In this embodiment, the nut 40 is also welded to the fender frame 14. The nut 40 may be previously welded to the fender frame 14 or may be welded to the fender frame 14 after fastening the nut 40 onto the bolt 38.

One welded portion is sufficient between the bolt 38 and the washer 66. Because of only one welded portion, the weld metal can be broken later for example by a chisel and the bolt 38 is then removed. In this way, the pad 60 can be easily replaced.

Figure 3A:
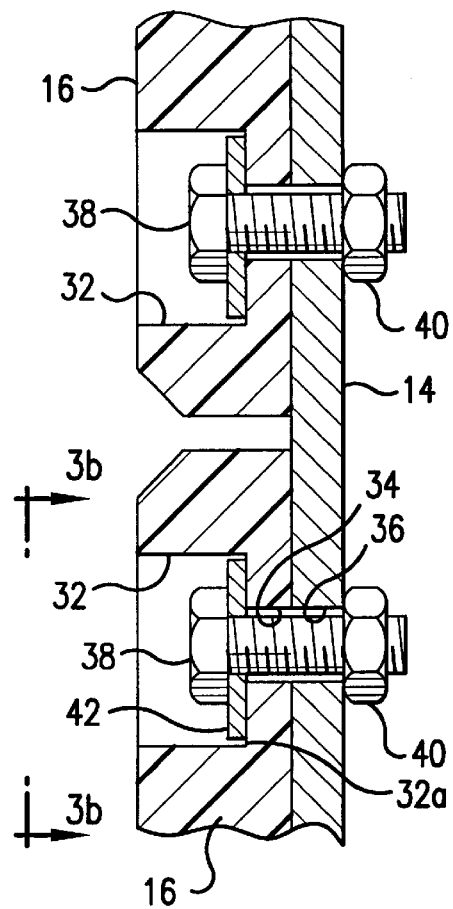
FIGS. 3a and 3b are enlarged views showing main parts of the marine fender according to the conventional example.
Figure 3B:
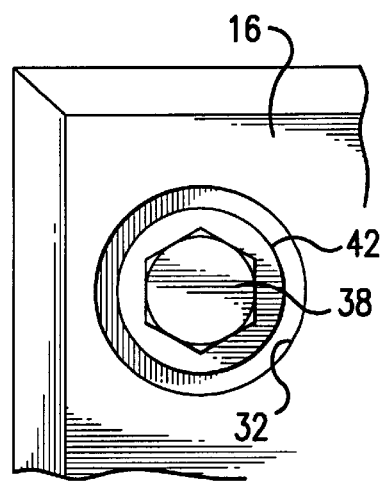
Figure 4:
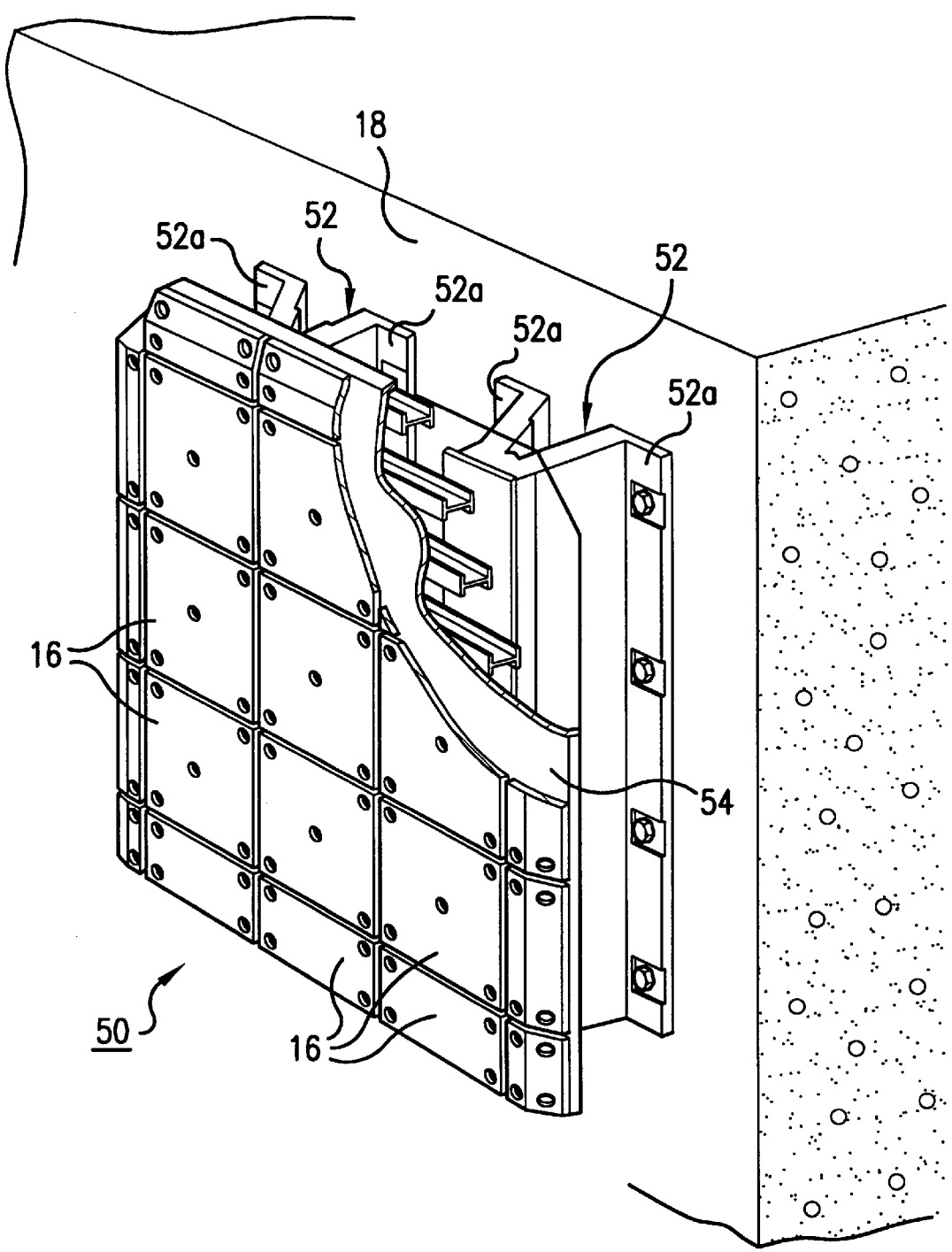
FIG. 4 is a perspective view of a marine fender according to another conventional example.

Since other components of the marine fender are the same as those of the marine fender mentioned with reference to FIGS. 3a, 3b and 4, the illustrating and description about the other components will be omitted.

In the marine fender having the structure as described above, the rectangular washer 66 is disposed in the rectangular concavity 62 so as not to rotate relative to each other and the head of the bolt 38 is welded to the washer 66. In addition, the nut 40 is welded to the fender frame 14. Therefore, there is no danger of the bolt 38 being loose. As also mentioned above, the bolt 38 can be removed by breaking the welded portion between the bolt 38 and the washer 66 for example by using a chisel and the pad 60 can be therefore replaced.

Figure 5A:
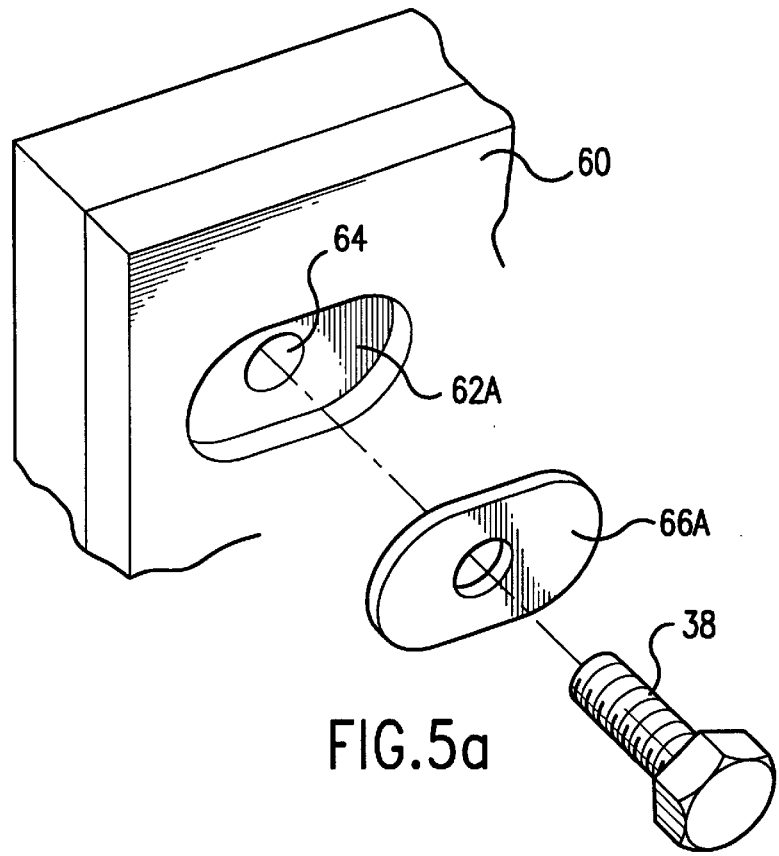
FIGS. 5a and 5b are perspective views showing main parts of a marine fender according to another embodiment.
Figure 5B:
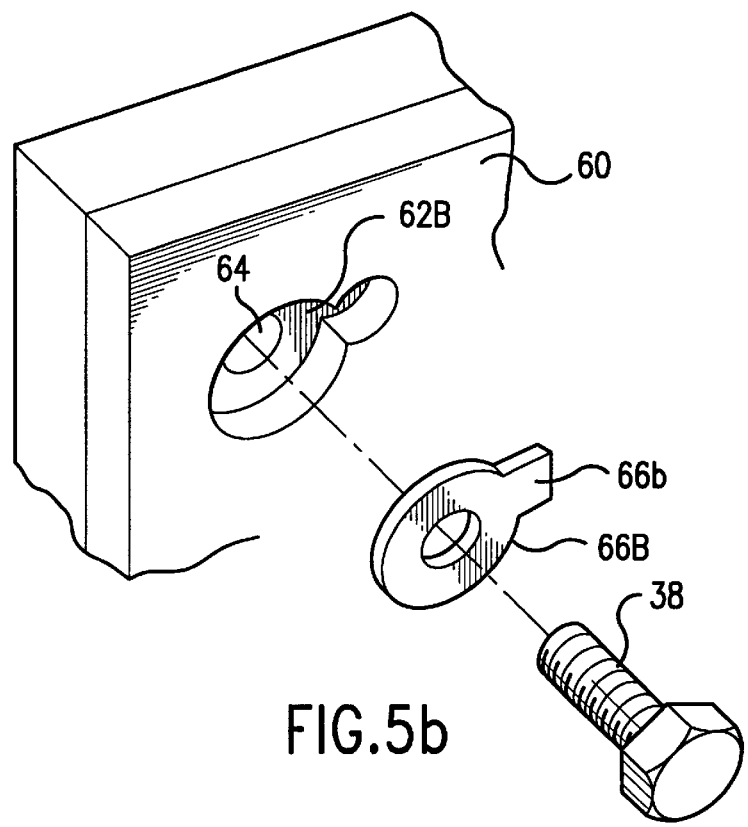

Though the concavities and the washers are formed in rectangle in FIG. 1a and FIG. 1b, the concavities and the washers may be formed in polygon such as pentagon and hexagon. As shown in FIG. 5a, oval concavities 62A and oval washers 66A may be employed. As shown in FIG. 5b, gourd-shaped concavities 62B and deformed washers 66B each having a projection 66b projecting from the periphery thereof may also be employed. Moreover, another concavities and washers each having a non-circular configuration other than that shown in the drawings may also be employed.

Figure 6A:
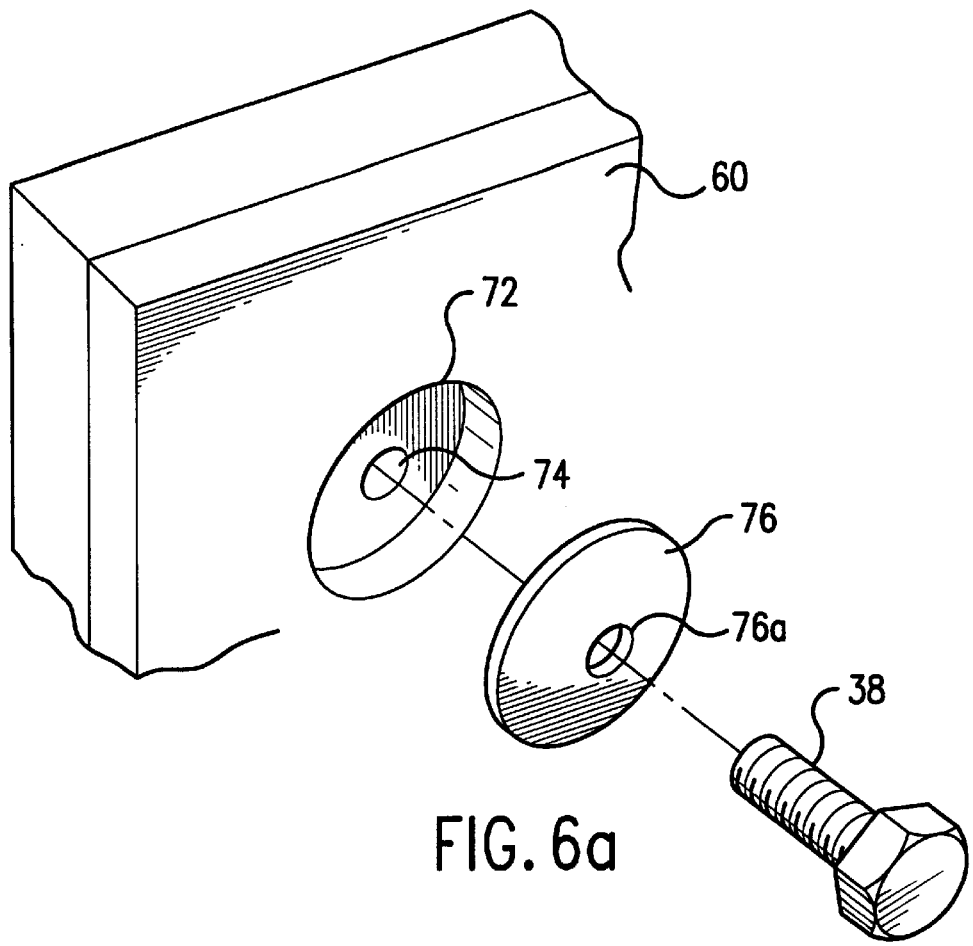
FIGS. 6a and 6b are structural views of a marine fender according to a further embodiment.
Figure 6B:
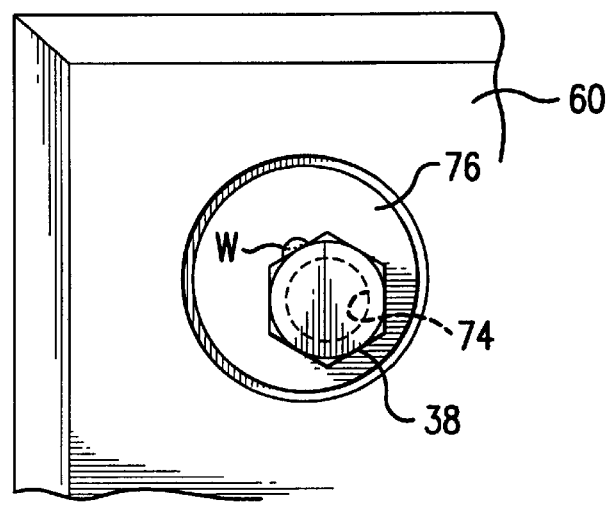

According to the present invention, circular concavities 72 and circular washers 76 as shown in FIG. 6a and FIG. 6b may also be employed. However, a bolt through hole 74 is formed eccentrically from the center of each concavity 72 and a hole 76a is also formed eccentrically from the center of each washer 76. The head of the bolt 38 is welded to the washer 76 as shown in FIG. 6b, thereby preventing the bolt 38 from rotating.

Figure 7A:
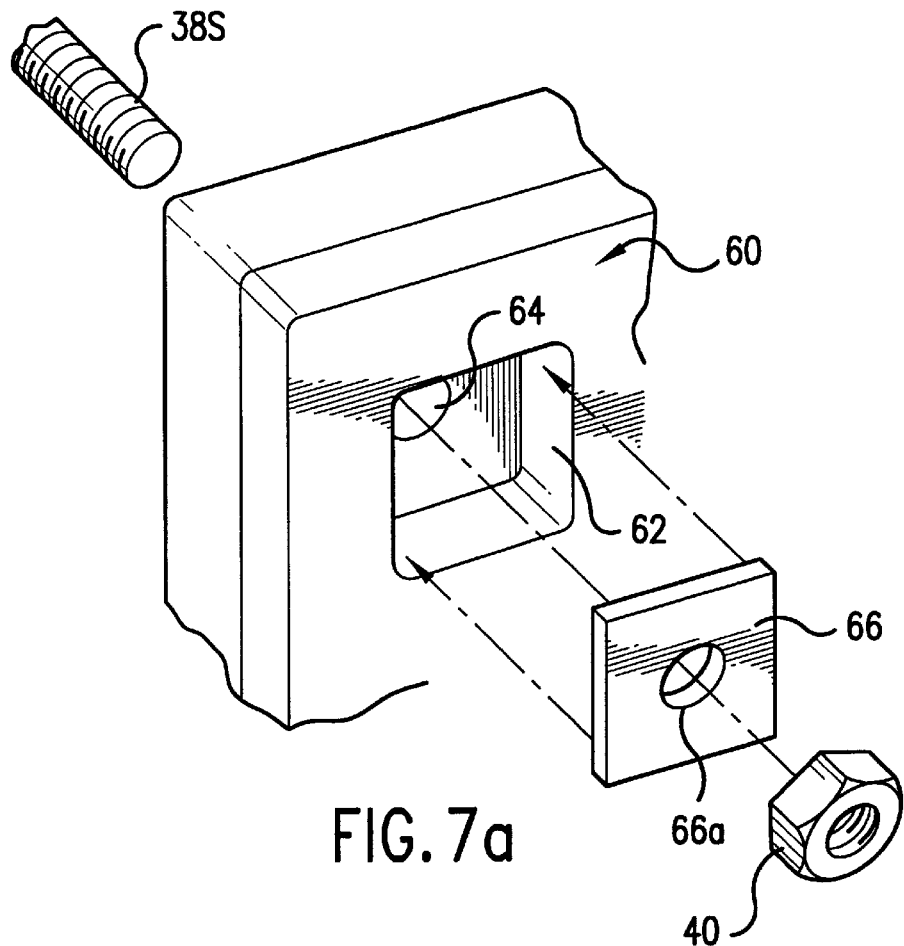
FIGS. 7a and 7b are structural views of a marine fender according to a still further embodiment.
Figure 7B:
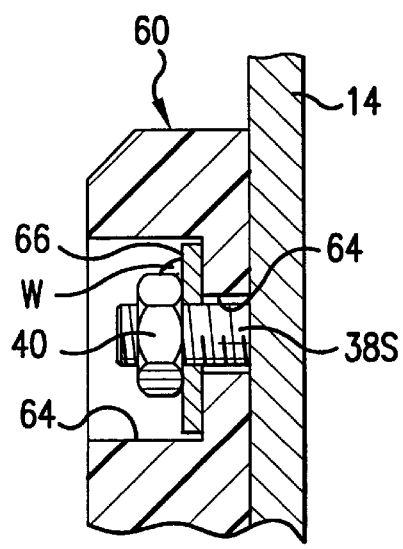

According to the present invention, as shown in FIG. 7a and FIG. 7b, the fender frame 14 may be provided with stud bolts 38S secured thereto. Each stud bolt 38S is inserted through the corresponding bolt through hole 64 of the pad 60, each nut 40 is screwed onto the stud bolt 38S through the rectangular washer 66 at the front side of the pad 60, and the nut 40 is welded to the washer 66 at a portion indicated by W. Though shown in FIG. 7a and FIG. 7b is an embodiment that the stud bolts 38S are applied to the pad shown in FIG. 1a and FIG. 1b, the stud bolts can be applied to the pad shown in FIGS. 5a, 5b or FIGS. 6a, 6b as well as FIGS. 7a, 7b.

Instead of the stud bolts 38S, the fender frame 14 may be provided with bolt through holes 36, not shown. In this case, the bolt 38 is inserted from the rear side of the fender frame 14 through the bolt through holes 36, 64 and the center hole 66a of the washer 66, the nut 40 is screwed onto the distal end of the bolt 38, and the nut 40 is welded to the washer 66.

Figure 2:
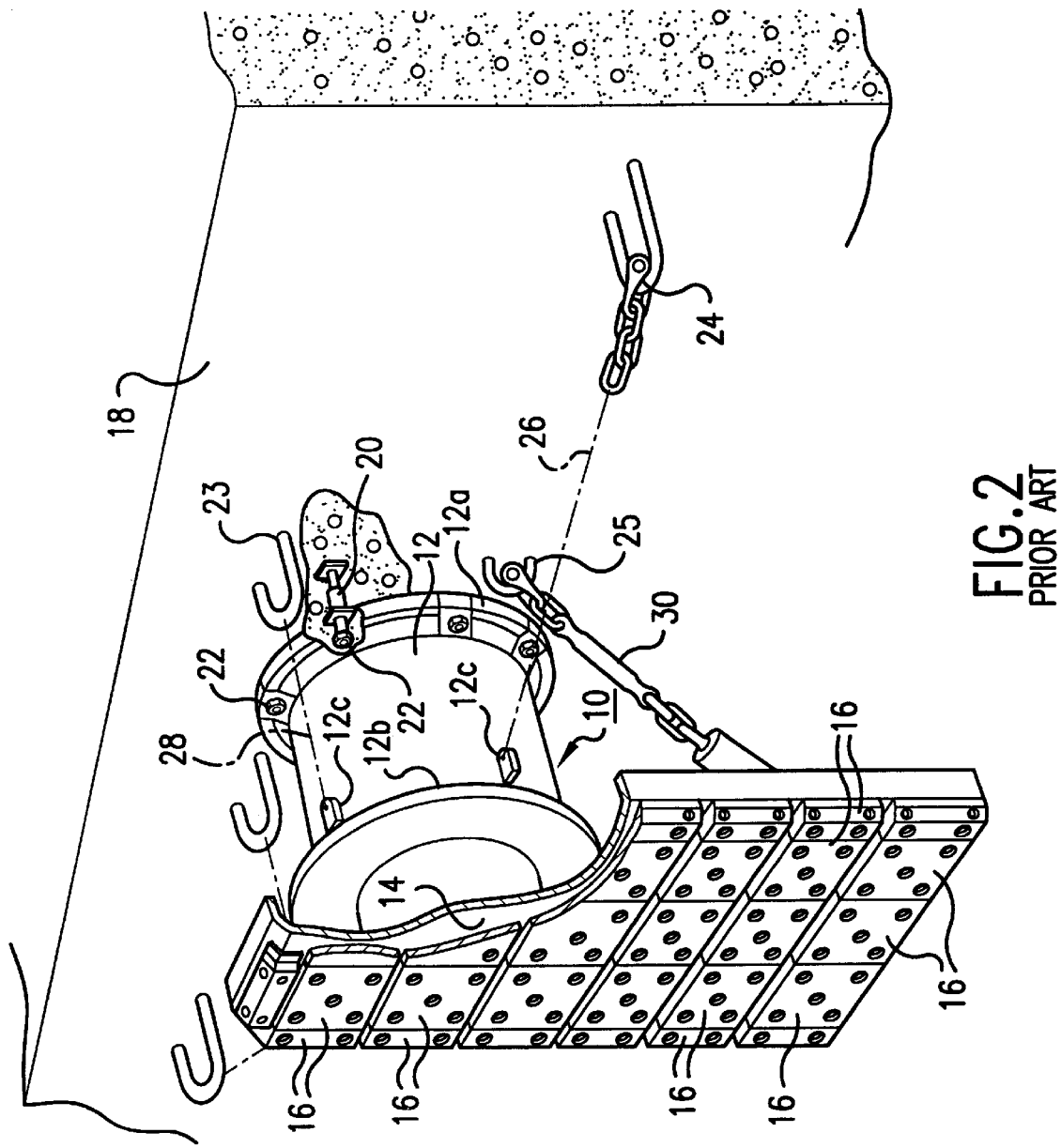
FIG. 2 is a structural view of a marine fender according to a conventional example.

Though the pads are attached to the fender frame 14 shown in FIGS. 2, 3a, and 3b in the above embodiments, the pad can be attached to fender frames of various types such as the fender frame 54 shown in FIG. 4 in the same manner as the above embodiments.

Though the secure fixing is achieved by welding the washer and the bolt head or the nut in the above embodiments, the fixing may be achieved by another fixing means such as adhesive agent. It should be noted that the welding can provide extremely secure fixing between them and allows the secure fixing to be released by a chisel or the like.

As apparent from the above description, according to the present invention, the structure for fixing the pads to the fender frame by bolts can securely prevent the looseness of the bolts and allow the easy remove and replacement of the pads.

What is claimed is:

1. A marine fender comprising:
 a marine fender body having a fender frame with a fender hole,
 a pad to be attached to the fender frame, said pad having at least one concavity formed in a front surface thereof, and a pad hole piercing the pad from a bottom of the at least one concavity and communicating with the fender hole,
 a bolt having a head, and inserted from a front side of the pad through the pad and fender holes,
 a nut disposed at a rear side of the fender frame and engaging a distal end of the bolt to fix the pad to the fender frame, and
 a washer interposed between the head of the bolt and the bottom of the at least one concavity, said washer being disposed in the at least one concavity such that a rim of the washer engages an inner periphery of the at least one concavity to prevent rotation with each other, said head of the bolt being joined to the washer.

2. A marine fender as claimed in claim 1, wherein the head of said bolt is joined to said washer by welding.

3. A marine fender as claimed in claim 1, wherein said concavity and said washer are in non-circular configuration.

4. A marine fender as claimed in claim 1, wherein said concavity and said washer are in circular configuration and said pad hole is formed eccentrically from a center of a circle thereof.

5. A marine fender as claimed in claim 1, wherein said nut is welded to the fender frame.

6. A marine fender comprising:
 a marine fender body having a fender frame,
 a pad to be attached to the fender frame, said pad having at least one concavity formed in a front surface thereof, and a pad hole piercing the pad from a bottom of the at least one concavity,
 a bolt attached to the fender frame and inserted from a rear side of the pad through the pad hole,
 a nut disposed at a front side of the fender frame and engaging a distal end of the bolt to fix the pad to the fender frame, and
 a washer interposed between the nut and the bottom of the at least one concavity, said washer being disposed in the at least one concavity such that a rim of the washer engages an inner periphery of the at least one concavity to prevent rotation with each other, said nut being joined to the washer.

7. A marine fender as claimed in claim 6, wherein said nut is joined to said washer by welding.

8. A marine fender as claimed in claim 6, wherein said concavity and said washer are in non-circular configuration.

9. A marine fender as claimed in claim 6, wherein said concavity and said washer are in circular configuration and said pad hole is formed eccentrically from the center of the circle thereof.

* * * * *